US010029528B2

(12) United States Patent
Suzuki et al.

(10) Patent No.: US 10,029,528 B2
(45) Date of Patent: Jul. 24, 2018

(54) URETHANE BUMPER SPRING, AND METHOD FOR PRODUCING SAME

(71) Applicant: Sumitomo Riko Company Limited, Komaki-shi, Aichi (JP)

(72) Inventors: Yasuo Suzuki, Komaki (JP); Takuya Hasegawa, Komaki (JP); Yorikazu Nakamura, Komaki (JP); Masanobu Mizusaki, Komaki (JP)

(73) Assignee: SUMITOMO RIKO COMPANY LIMITED, Komaki-shi (JP)

( * ) Notice: Subject to any disclaimer, the term of this patent is extended or adjusted under 35 U.S.C. 154(b) by 0 days.

(21) Appl. No.: 15/234,542

(22) Filed: Aug. 11, 2016

(65) Prior Publication Data

US 2016/0347140 A1    Dec. 1, 2016

Related U.S. Application Data

(63) Continuation of application No. PCT/JP2015/055327, filed on Feb. 25, 2015.

(30) Foreign Application Priority Data

Mar. 26, 2014    (JP) .................................. 2014-063589

(51) Int. Cl.
F16F 1/37    (2006.01)
F16F 9/58    (2006.01)
(Continued)

(52) U.S. Cl.
CPC .............. B60G 11/22 (2013.01); B29C 39/02 (2013.01); B29C 39/24 (2013.01);
(Continued)

(58) Field of Classification Search
CPC . B60G 11/22; F16F 1/37; F16F 1/3605; F16F 1/376
(Continued)

(56) References Cited

U.S. PATENT DOCUMENTS 3,516,950 A * 6/1970 Haggis ................. C08G 18/022
                                                521/112
3,823,099 A * 7/1974 Doyle ......................... C08J 9/06
                                                521/120
(Continued)

FOREIGN PATENT DOCUMENTS

JP    57-100121 A    6/1982
JP    59-108040 A    6/1984
(Continued)

OTHER PUBLICATIONS

Notification of Transmittal of Translation of the International Preliminary Report on Patentability (Form PCT/IB/338) issued in counterpart International Application No. PCT/JP2015/055327 dated Oct. 6, 2016 with Forms PCT/IB/373 and PCT/ISA/237. (6 pages).

(Continued)

Primary Examiner — Thomas J Williams
Assistant Examiner — James K Hsiao
(74) Attorney, Agent, or Firm — Westerman, Hattori, Daniels & Adrian, LLP

(57) ABSTRACT

A urethane bumper spring is produced from a urethane raw material containing a polyester-based polyol as a polyol component and diphenylmethane diisocyanate as an isocyanate component, and includes: a skin layer; and a core portion, in which the skin layer has a density (Da) and a foamed cell diameter (Ra), and the core portion has a density (Db) and a foamed cell diameter (Rb). The density (Da), the foamed cell diameter (Ra), the density (Db), and the foamed cell diameter (Rb) satisfy relationships shown in the following expressions: $1.0 \leq Da/Db < 1.34$ (1) and $0.53 < Ra/Rb \leq 1.0$ (2). Accordingly, the urethane bumper spring can achieve a cost reduction while having durability and settling resistance under high load and high deformation.

18 Claims, 4 Drawing Sheets

(51) Int. Cl.
*B60G 11/22* (2006.01)
*B29C 39/02* (2006.01)
*B29C 39/24* (2006.01)
*C08G 18/42* (2006.01)
*F16F 1/36* (2006.01)
*F16F 1/376* (2006.01)
*C08G 18/66* (2006.01)
*C08G 18/76* (2006.01)
*C08G 18/32* (2006.01)
*B29C 45/00* (2006.01)
*B29C 45/18* (2006.01)
*B29C 45/36* (2006.01)
*B29C 45/72* (2006.01)
*C08G 101/00* (2006.01)
*B29K 75/00* (2006.01)
*B29K 105/00* (2006.01)
*B29L 31/30* (2006.01)
*B29L 31/00* (2006.01)

(52) U.S. Cl.
CPC ...... *B29C 45/0001* (2013.01); *B29C 45/1866* (2013.01); *B29C 45/36* (2013.01); *B29C 45/7207* (2013.01); *C08G 18/3206* (2013.01); *C08G 18/42* (2013.01); *C08G 18/664* (2013.01); *C08G 18/7671* (2013.01); *F16F 1/3605* (2013.01); *F16F 1/37* (2013.01); *F16F 1/376* (2013.01); *B29K 2075/00* (2013.01); *B29K 2105/0002* (2013.01); *B29L 2031/30* (2013.01); *B29L 2031/774* (2013.01); *B60G 2202/143* (2013.01); *B60G 2204/45021* (2013.01); *B60G 2206/73* (2013.01); *B60G 2206/8106* (2013.01); *B60G 2206/81012* (2013.01); *C08G 2101/0083* (2013.01); *F16F 9/58* (2013.01)

(58) Field of Classification Search
USPC .......................................................... 267/292
See application file for complete search history.

(56) References Cited

U.S. PATENT DOCUMENTS

| | | | |
|---|---|---|---|
| 5,698,608 A | 12/1997 | Nagashima | |
| 5,731,361 A * | 3/1998 | Horn ................... | C08G 18/625 521/137 |
| 6,099,955 A | 8/2000 | Sakai et al. | |
| 6,541,119 B2 * | 4/2003 | Sadvary ............... | C08G 77/388 427/389 |
| 2001/0031797 A1 | 10/2001 | Kuwamura et al. | |
| 2004/0075204 A1* | 4/2004 | Heidemann ............. | F16F 1/376 267/294 |
| 2008/0012188 A1* | 1/2008 | Dickson ................ | F16F 1/3732 267/139 |
| 2011/0156327 A1* | 6/2011 | Nobusue .................. | B60G 7/04 267/153 |
| 2012/0193850 A1* | 8/2012 | Szekely ................ | F16F 1/3732 267/292 |
| 2012/0193851 A1* | 8/2012 | Szekely ................ | F16F 1/3732 267/292 |
| 2012/0292842 A1* | 11/2012 | Van Der Zyppe ........ | F16F 9/58 267/292 |
| 2014/0312542 A1* | 10/2014 | Takata .................. | F16F 1/3605 267/141 |
| 2015/0231941 A1* | 8/2015 | Seo ........................ | B60G 15/06 267/220 |
| 2016/0016342 A1* | 1/2016 | Al-Dahhan ........... | B29C 44/569 267/292 |

FOREIGN PATENT DOCUMENTS

| | | |
|---|---|---|
| JP | 05-202164 A | 8/1993 |
| JP | 9-302059 A | 11/1997 |
| JP | 2002-30129 A | 1/2002 |
| JP | 2004-293697 A | 10/2004 |
| JP | 2006-56132 A | 3/2006 |
| JP | 3758343 B2 | 3/2006 |

OTHER PUBLICATIONS

International Search Report dated May 26, 2015, issued in counterpart International Application No. PCT/JP2015/055327 (1 page).
Notification of Reasons for Revocation dated Jul. 13, 2016, issued in counterpart Japanese Patent No. 5798656, with English translation. (13 pages).
Office Action dated Apr. 27, 2017, issued in counterpart Chinese Application No. 201580012794.6, with English tanslation. (12 pages).
Advance Notification of Reasons for Revocation dated Dec. 16 2016, issued in counterpart Japanese Patent No. 5798656, with English translation. (42 pages).
Evidence 2-1 Publication "Polyurethane and Related Foams Chemistry and Technology",2007, Taylor & Francis Group, LLC, front page, pp. 1-2, pp. 74-75. Cited in the Advance Notification of Reasons for Revocation dated Dec. 16, 2016.
Evidence 3-1 Publication "Handbook of Plastic Foams", edited by Arthur H. Landrock (ret.) 1995 by Noyes Publications, cover page, pp. 1-2, pp. 56-57. Cited in the Advance Notification of Reasons for Revocation dated Dec. 16, 2016.
Evidence 6-1 Publication "Advances in Polyurethane Technology", edited by J. M. Buist and H. Gudgeon, 1968 Imperial Chemical Industries Ltd., cover page, pp. 1-2, pp. 176-177. Cited in the Advance Notification of Reasons for Revocation dated Dec. 16, 2016.
Evidence 8-1 "Temperature and Mold Size Effects on Physical and Mechanical Properties of a Polyurethane Foam", Dacia Jackovich, et al., Journal of Cellular Plastics, vol. 41, Mar. 2005, pp. 153-168. Cited in the Advance Notification of Reasons for Revocation dated Dec. 16, 2016.
Evidence 9-1 "Polyurethanes Chemistry and Technology", J. H. Saunders and K.C. Frisch, 1964, Interscience Publishers, cover page, pp. 1-2, pp. 102-103. Cited in the Advance Notification of Reasons for Revocation dated Dec. 16, 2016.
Evidence 10 "Polyurethane Foam", Yoshia Imai, published by Polymer Publishing Co., Ltd., Sep. 10, 2000, cover page, pp. 106-107. Cited in the Advance Notification of Reasons for Revocation dated Dec. 16, 2016.
Evidence 12 "Dow Polyurethanes Flexible Foams", edited by Ron Herrington and Kathy Hock, published by the Dow Chemical Company, 1997, front cover page, back cover page, Section 2, p. 23. Cited in the Advance Notification of Reasons for Revocation dated Dec. 16, 2016.
Evidence 13 "Polyurthane Resin Handbook", Toshiharu Iwata, published by Nikkan Kogyo Shinbun Ltd., Sep. 25, 1987, cover page, pp. 356-359. Cited in the Advance Notification of Reasons for Revocation dated Dec. 16, 2016.
Extended (supplementary) European Search Report dated Mar. 3, 2017, issued in counterpart European Application No. 15768322.8. (8 pages).
Office Action dated Jan. 3, 2018, issued in counterpart European Application No. 15768322.8. (4 pages).

* cited by examiner

URETHANE BUMPER SPRING, AND METHOD FOR PRODUCING SAME

RELATED APPLICATION

This application is a continuation of International Application No. PCT/JP2015/55327, filed on Feb. 25, 2015, which claims priority to Japanese Patent Application No. 2014-063589, filed on Mar. 26, 2014, the entire contents of each of which are hereby incorporated by reference.

TECHNICAL FIELD

The present disclosure relates to a urethane bumper spring configured to be mounted onto a piston rod of a shock absorber in a suspension mechanism of a vehicle so as to elastically restrain an operation stroke of the shock absorber, and to a method of producing the same.

BACKGROUND ART

For example, as illustrated in FIG. 1, a substantially tubular (bellows-shaped) bumper spring 2 formed of an elastic material, e.g., a rubber or a foamed polyurethane resin is externally fitted onto a piston rod 31 of a shock absorber 30 serving as a component of a suspension of a vehicle, and the bumper spring 2 is arranged between a cylinder (absorber plate) 32 of the shock absorber 30, and a fitting portion thereof on a vehicle body side (upper support 33) (see Patent Literature 1).

As a typical example of the bumper spring for a vehicle, there is given a urethane bumper spring using a foamed polyurethane resin (hereinafter abbreviated as "urethane"). In addition, as a method of producing the urethane bumper spring, mold-forming involving using a forming mold (die) is generally used (see Patent Literature 2).

The mold-forming of the urethane is a method of obtaining a urethane bumper spring as a product involving: injecting (casting) a urethane raw material into a forming cavity of a forming mold (die) formed of a master mold and a core, followed by heating, to thereby cure the urethane raw material through a reaction (foaming) in the forming mold; and then removing the resultant from the forming mold, followed by extraction of the forming mold core inside a tubular urethane molded body (demolding). As a foaming/curing method for the urethane, there is known a method involving two-stage heating steps, i.e., primary vulcanization and secondary vulcanization. In that case, the forming mold core inside the urethane molded body subjected to the primary vulcanization (semi-cured article) is extracted (demolding is performed) before the urethane molded body is further heated to be subjected to secondary vulcanization, and thus the urethane bumper spring is obtained as a completely cured article (product) (see Patent Literature 3).

RELATED ART DOCUMENTS

Patent Documents

PTL 1: JP-B2-3758343
PTL 2: JP-A-2004-293697
PTL 3: JP-A-2006-56132

SUMMARY OF INVENTION

A urethane bumper spring is required to withstand high load and high deformation, and hence a urethane raw material containing 1,5-naphthalene diisocyanate (NDI) as an isocyanate component is generally used for the urethane bumper spring. However, there is a problem in that such urethane bumper spring is difficult to apply to a general type of vehicle owing to high material cost of NDI. Accordingly, there is a demand for a bumper spring capable of achieving a cost reduction while having durability and settling resistance under high load and high deformation.

The disclosed urethane bumper spring is capable of achieving a cost reduction while having durability and settling resistance under high load and high deformation, and a method of producing the same is disclosed.

According to a first aspect, there is provided an urethane bumper spring having a hollow cylindrical shape, which is produced by mold forming and which has a skin layer in an outer layer thereof, the urethane bumper spring being configured to be fitted onto a piston rod of a shock absorber of a vehicle so as to elastically restrain an operation stroke of the shock absorber, the urethane bumper spring being produced from a urethane raw material containing a polyester-based polyol as a polyol component and diphenylmethane diisocyanate as an isocyanate component, the urethane bumper spring including: a skin layer; and a core portion, in which the skin layer has a density (Da) and a foamed cell diameter (Ra), and the core portion has a density (Db) and a foamed cell diameter (Rb), the density (Da), the foamed cell diameter (Ra), the density (Db), and the foamed cell diameter (Rb) satisfying relationships shown in the following expressions (1) and (2).

$$1.0 \leq Da/Db < 1.34 \quad (1)$$

$$0.53 < Ra/Rb \leq 1.0 \quad (2)$$

Further, according to a second aspect, there is provided a method of producing the urethane bumper spring of the first aspect, the method including: a step of injecting a urethane raw material containing a polyester-based polyol as a polyol component and diphenylmethane diisocyanate as an isocyanate component into a cavity of a forming mold, followed by heating at 70° C. or more, to thereby subject the urethane raw material to primary vulcanization in the forming mold; a demolding step of removing a urethane molded body after the primary vulcanization from the forming mold; and a step of heating the urethane molded body after the demolding to subject the urethane molded body to secondary vulcanization.

That is, the inventors have made extensive investigations in order to achieve the above-mentioned object. During the course of the investigations, the inventors have considered the use of a urethane raw material containing low-cost diphenylmethane diisocyanate (MDI) as an isocyanate component. As described above, however, there are problems in durability and settling resistance. The inventors have made further investigations in order to ascertain the cause of the problems, and as a result, have obtained the following finding: owing to notable differences in density and foamed cell diameter between the skin layer and the core portion of the urethane bumper spring, an internal crack (fracture) due to strain (stress concentration) is liable to occur in the bumper spring using the urethane raw material containing MDI as an isocyanate component, with the result that such bumper spring is poor in durability and settling resistance. In the case of the urethane bumper spring produced by mold forming, as described above, the skin layer is formed in its outer layer (portion brought into contact with a forming mold). When the skin layer poses the problems as described above, a measure involving cutting the skin layer after demolding is conceivable, but such measure still has, for example, the following problems: dimensional accuracy is not obtained; and a production process is complicated. In view of the foregoing, the inventors have made investigations on causing the skin layer and the core portion to have more similar densities and more similar foamed cell diameters, and as a result, have ascertained that, through the optimization of the polyol component, the optimization of the production method, and the like, the skin layer and the core portion can be caused to have more similar densities and more similar foamed cell diameters even in the case of the urethane raw material containing MDI as an isocyanate component. That is, the inventors have found that the desired object can be achieved when the densities and the foamed cell diameters of the skin layer and the core portion satisfy the specific relationships. Thus, the inventors have reached the embodiment of the present invention.

The urethane bumper spring is a hollow cylindrical one produced by mold forming, and is produced from the urethane raw material containing the polyester-based polyol as a polyol component and diphenylmethane diisocyanate as an isocyanate component. In the urethane bumper spring, the density and the foamed cell diameter of the skin layer, and the density and the foamed cell diameter of the core portion satisfy the specific relationships. Accordingly, the urethane bumper spring is excellent in durability and settling resistance under high load and high deformation, and besides, can achieve a cost reduction.

Further, the method of producing the urethane bumper spring includes: a step of injecting the urethane raw material containing a polyester-based polyol as a polyol component and diphenylmethane diisocyanate as an isocyanate component into the cavity of the forming mold, followed by heating at 70° C. or more, to thereby subject the urethane raw material to primary vulcanization in the forming mold; a demolding step of removing the urethane molded body after the primary vulcanization from the forming mold; and a step of heating the urethane molded body after the demolding to subject the urethane molded body to secondary vulcanization. Through the use of such production method, the urethane bumper spring as described above can be satisfactorily produced.

DESCRIPTION OF EMBODIMENTS

Now, embodiments of the present invention are described in detail.

Figure 1:
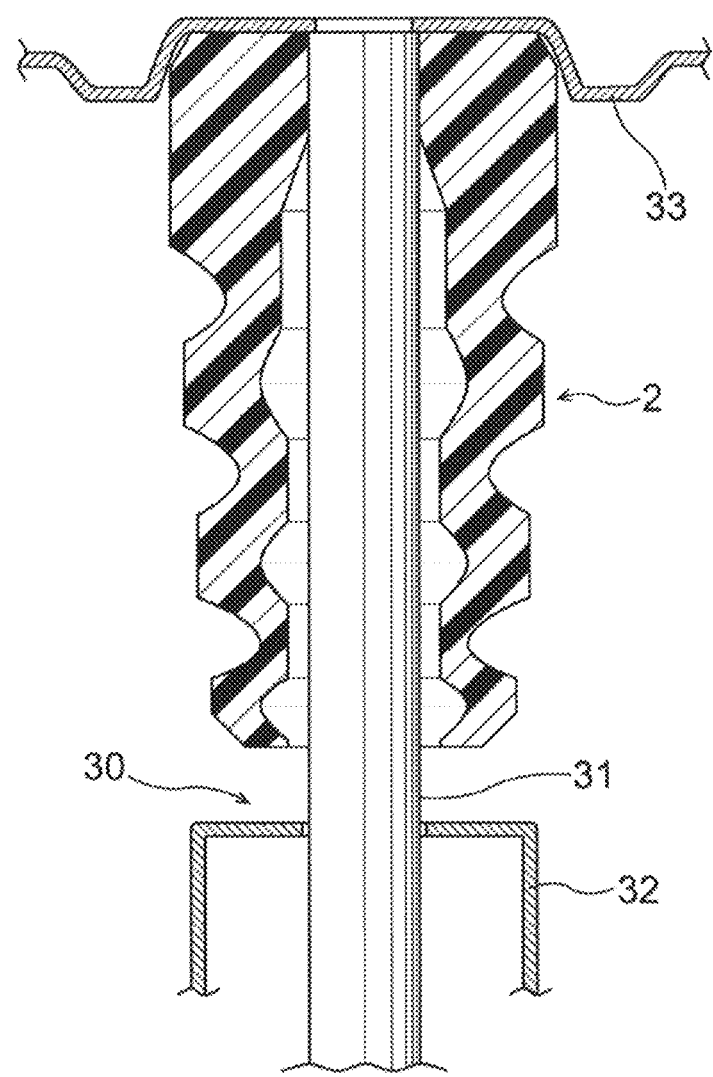
FIG. 1 is an explanatory view illustrating a urethane bumper spring according to one embodiment of the present invention.

A urethane bumper spring of the embodiments of the present invention is one to be fitted onto a piston rod of a shock absorber in a suspension system of an automobile so as to serve as a stopper or the like configured to elastically restrain an operation stroke of the shock absorber. The external appearance of the urethane bumper spring is, for example, a hollow cylindrical shape as with a related-art urethane bumper spring as illustrated in FIG. 1.

The urethane bumper spring is produced by mold forming, and hence has a skin layer in its outer layer (portion brought into contact with a forming mold) as with a related-art urethane bumper spring produced by mold forming. However, the urethane bumper spring is produced from a urethane raw material containing a polyester-based polyol as a polyol component and diphenylmethane diisocyanate (MDI) as an isocyanate component, and includes: a skin layer; and a core portion, in which the skin layer has a density (Da) and a foamed cell diameter (Ra), and the core portion has a density (Db) and a foamed cell diameter (Rb), the density (Da), the foamed cell diameter (Ra), the density (Db), and the foamed cell diameter (Rb) satisfying relationships shown in the following expressions (1) and (2). The "skin layer" refers to a portion within 2 mm from a molded body surface in a thickness direction, and the "core portion" refers to a portion deeper than the skin layer.

$$1.0 \leq Da/Db < 1.34 \quad (1)$$

$$0.53 < Ra/Rb \leq 1.0 \quad (2)$$

Figure 2A:
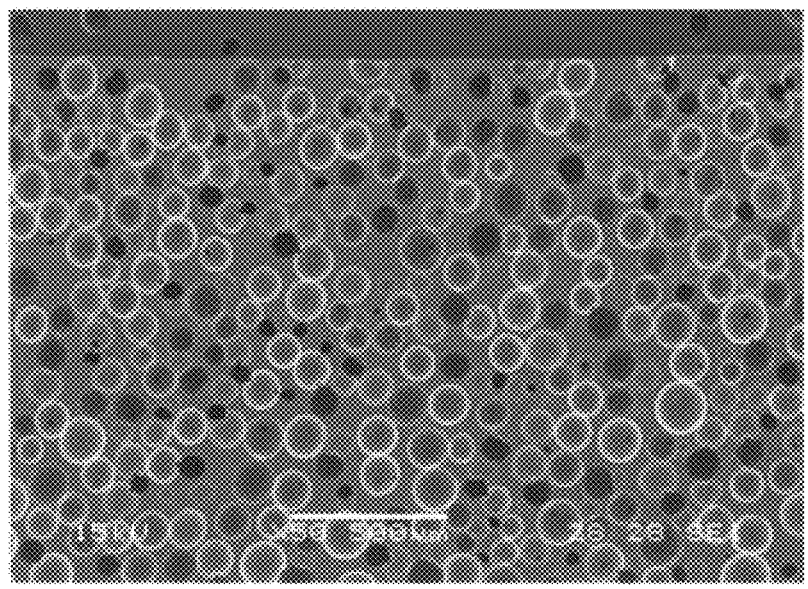
FIG. 2A and FIG. 2B are electron micrographs showing a cross-section of a skin layer and a cross-section of a core portion, respectively, in a urethane bumper spring of the embodiment of the present invention.
Figure 2B:
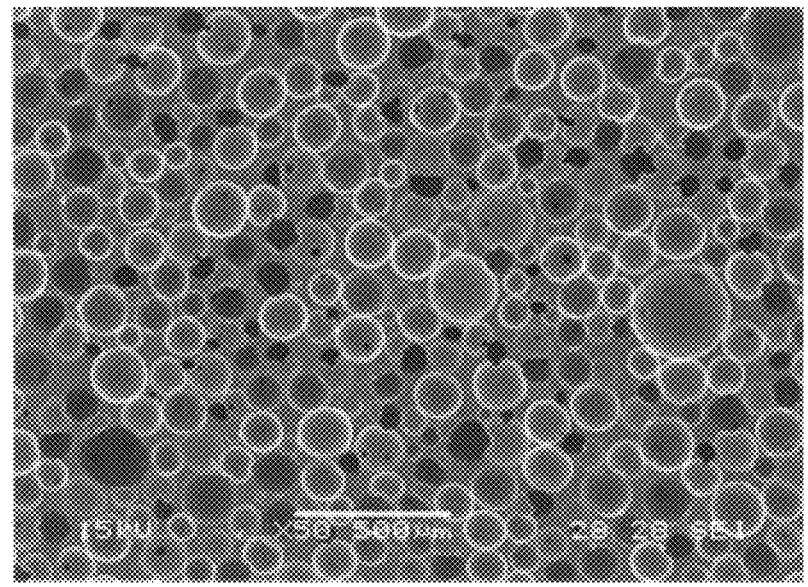
Figure 3A:
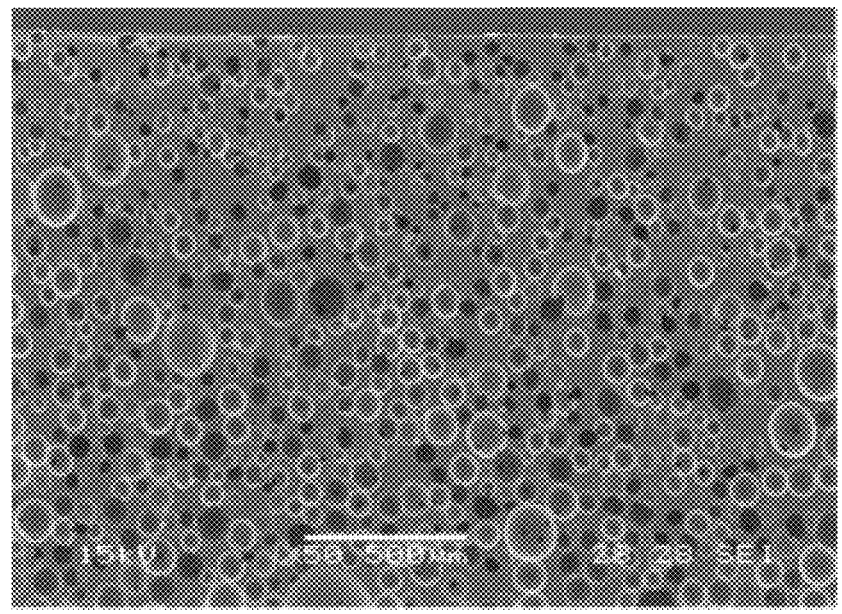
FIG. 3A and FIG. 3B are electron micrographs showing a cross-section of a skin layer and a cross-section of a core portion, respectively, in a related-art urethane bumper spring.
Figure 3B:
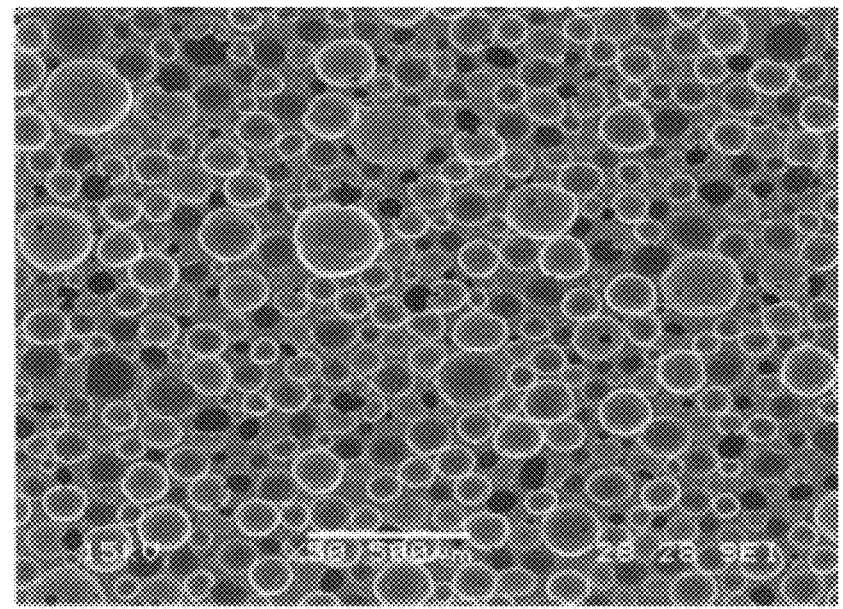

FIG. 2A and FIG. 2B are electron micrographs (magnification of 50) showing a cross-section of a skin layer and a cross-section of a core portion, respectively, in the urethane bumper spring. FIG. 3A and FIG. 3B are electron micrographs (magnification of 50 times) showing a cross-section of a skin layer and a cross-section of a core portion, respectively, in the related-art urethane bumper spring. It is found from the cross-sectional photographs that the urethane bumper spring has less difference in foamed state between the skin layer and the core portion than in the related art. The skin layer and the core portion in the urethane bumper spring of FIG. 2 satisfy the relationships shown in the expressions (1) and (2), whereas the skin layer and the core portion in the related-art urethane bumper spring of FIG. 3 do not satisfy the relationships shown in the expressions (1) and (2).

In the urethane bumper spring, the density (Da) of the skin layer and the density (Db) of the core portion need to satisfy the relationship shown in the expression (1). The density (Da) of the skin layer falls within the range of preferably from 0.4 g/cm$^3$ to 0.7 g/cm$^3$, more preferably from 0.5 g/cm$^3$ to 0.6 g/cm$^3$. In addition, the density (Db) of the core portion falls within the range of preferably from 0.4 g/cm$^3$ to 0.7 g/cm$^3$, more preferably from 0.5 g/cm$^3$ to 0.6 g/cm$^3$.

In addition, in the urethane bumper spring, the foamed cell diameter (Ra) of the skin layer and the foamed cell diameter (Rb) of the core portion need to satisfy the relationship shown in the expression (2). The foamed cell diameter (Ra) of the skin layer falls within the range of preferably from 25 μm to 400 μm, more preferably from 50 μm to 300 μm. In addition, the foamed cell diameter (Rb) of the core portion falls within the range of preferably from 25 μm to 400 μm, more preferably from 50 μm to 300 μm.

The density of each of the skin layer and the core portion is measured for a sample of the corresponding site using, for example, an automatic densimeter DSG-1 manufactured by Toyo Seiki Seisaku-sho, Ltd. In addition, the foamed cell diameter of each of the skin layer and the core portion is obtained by, for example, measuring, on the basis of cross-sectional photographs taken with an electron microscope as described above, the 10-point average of the diameters (cell diameters) of the foamed cells (hollow cells) thereof.

In the urethane bumper spring, as described above, despite the use of the urethane raw material containing diphenylmethane diisocyanate (MDI) as an isocyanate component, the density and the foamed cell diameter of the skin layer and the density and the foamed cell diameter of the core portion satisfy the above-mentioned relationships mainly by virtue of the optimization of the polyol component and the optimization of the production method.

That is, the polyester-based polyol is used as the polyol component in the urethane raw material. The polyester-based polyol is not particularly limited, but it is preferred that a polyester-based polyol formed of a condensation polymer of ethylene glycol, butanediol, and adipic acid be used as the polyester-based polyol. This is because, when the urethane raw material containing the specific polyester-based polyol and MDI is used and, as described later, primary vulcanization is performed with the temperature of a forming mold set to high temperature, the urethane bumper spring including the skin layer and the core portion as described above can be satisfactorily produced.

The polyester-based polyol formed of a condensation polymer of ethylene glycol, butanediol, and adipic acid has low freezing point. Accordingly, for example, when a prepolymer method is adopted, work involving melting the polyester-based polyol in advance before the preparation of a prepolymer is not required, and hence the preparation of the prepolymer is facilitated. In addition, by virtue of the low freezing point, a one-shot method, which includes a smaller number of steps than the prepolymer method, can also be adopted. As just described, the use of the specific polyester-based polyol provides advantages in terms of production method as well.

In addition, the polyester-based polyol preferably has a number-average molecular weight (Mn) of from 500 to 4,000, and the number-average molecular weight (Mn) more preferably falls within the range of from 1,000 to 3,000. This is because, when the polyester-based polyol having such number-average molecular weight is used, the bumper spring having the characteristic structure as described above can be satisfactorily produced. The number-average molecular weight (Mn) may be determined by gel permeation chromatography measurement or the like.

Examples of the diphenylmethane diisocyanate (MDI) to be used with the polyester-based polyol include 2,2'-MDI, 2,4'-MDI, 4,4'-MDI, and polymeric MDI. One kind of those diphenylmethane diisocyanates is used alone, or two or more kinds thereof are used in combination.

In the urethane bumper spring, as described above, the urethane raw material to be used contains the polyester-based polyol as a polyol component and diphenylmethane diisocyanate (MDI) as an isocyanate component. In addition, with regard to the blending ratio of the isocyanate component with respect to the polyol component, it is preferred that the components be blended so that the NCO index of the urethane raw material [equivalent ratio of an NCO group in the isocyanate to a hydroxy group in the polyol (NCO group/OH group)] may fall within the range of from 0.9 to 1.3 from the viewpoint of satisfactorily producing the bumper spring having the characteristic structure as described above. From a similar viewpoint, the NCO index more preferably falls within the range of from 1.0 to 1.2.

In addition, the urethane raw material contains the polyol component, the isocyanate component, and as necessary, a foaming agent, such as water, a chain extender, a catalyst, a foam stabilizer, a hydrolysis inhibitor, a flame retardant, a viscosity reducer, a stabilizer, a filler, a cross-linking agent, a colorant, or the like.

Herein, a method of producing the urethane bumper spring includes, for example:
1) a die preparing step of preparing a forming mold (die) formed of a master mold and a core;
2) a primary vulcanization step of injecting (casting) the urethane raw material into the forming cavity of the die, followed by heating, to thereby foam and cure (semi-cure) the urethane raw material to obtain a molded body (semi-processed product) for a bumper spring;
3) a demolding step of removing the bumper spring molded body after the primary vulcanization from the master mold, followed by the extraction of the core from the inner periphery of the molded body; and
4) a secondary vulcanization step of heating the bumper spring molded body after the demolding to complete the curing reaction of the urethane, to thereby obtain a urethane bumper spring as a product.

The urethane bumper spring is specifically produced as described below in accordance with the steps 1) to 4).

[Die Preparing Step]

First, a die capable of forming a cavity having the same shape as the bumper spring (see FIG. 1) is prepared. In addition, as necessary, the surface (outer peripheral surface) of its core is coated with a release agent by means of a spray or any other method, followed by drying, to form a uniform coating film formed of the release agent. Then, the master mold and the core are combined to form a predetermined forming cavity, and then the die is heated to a predetermined temperature (70° C. or more).

[Primary Vulcanization Step]

Next, the urethane raw material containing the polyester-based polyol as a polyol component and diphenylmethane diisocyanate as an isocyanate component is injected into the cavity of the forming mold, and is heated at 70° C. or more (preferably from 70° C. to 130° C.) for from 2 minutes to 60 minutes to be foamed and cured into polyurethane foam. Thus, a bumper spring molded body subjected to primary vulcanization (semi-processed product) is produced. When the heating temperature is 150° C. or more, there is a risk in that a surface blister of the molded body may occur. In addition, the urethane raw material may be injected into the cavity of the forming mold after the preparation of a prepolymer in advance in accordance with the prepolymer method, or the polyol component and the isocyanate component may be mixed in the cavity of the forming mold in accordance with the one-shot method.

[Demolding Step]

Next, the bumper spring molded body after the completion of the primary vulcanization is removed from the master mold, and then the core is extracted from the inner periphery of the molded body.

[Secondary Vulcanization Step]

After that, the bumper spring molded body removed from the die as described above is heated using a heating furnace or the like in accordance with predetermined conditions to allow an unreacted polyol component and polyisocyanate component remaining in the molded body to sufficiently react. Thus, the curing reaction is completed to obtain a urethane bumper spring as a finished product. As heating conditions in the secondary vulcanization step, conditions of heating at a temperature of from about 100° C. to about 150° C. for from about 3 hours to about 20 hours are adopted.

The thus obtained urethane bumper spring is suitable as a bumper spring to be mounted onto a piston rod of a shock absorber.

EXAMPLES

Now, Examples are described together with Comparative Example. However, the embodiment of the present invention is not limited to these Examples, and modifications are possible without departing from the gist of the present disclosure.

First, prior to Examples and Comparative Example, materials shown below were prepared.

[Polyol Agent]

A polyol agent which contains a polyester-based polyol as a polyol component thereof (Toral HT-2040, manufactured by DIC Corporation)

[Chain Extender]

Ethylene glycol

[Catalyst]

Toral SM-2, manufactured by DIC Corporation

[Foaming Agent]

Water

[Isocyanate Agent]

An isocyanate agent which contains MDI as an isocyanate component thereof (Toral F-2560, manufactured by DIC Corporation)

Example 1

Figure 4:
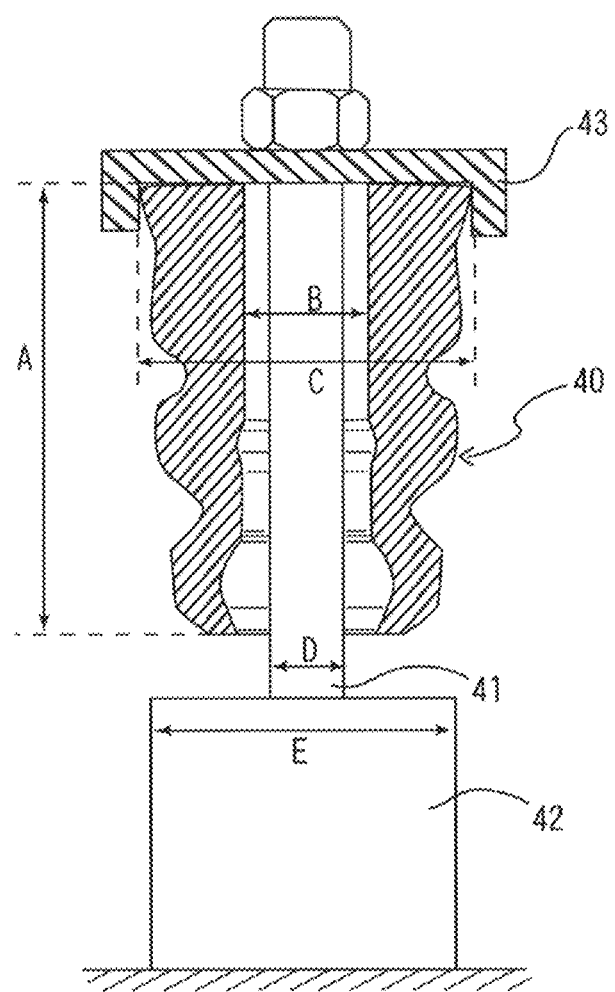
FIG. 4 is an explanatory view illustrating a measurement method for a durability test of a urethane bumper spring in Examples.

A liquid A formed of 100 parts by weight of a polyol agent, 11.8 parts by weight of a chain extender, 1.1 parts by weight of a catalyst, and 0.6 part by weight of a foaming agent was prepared. In addition, a liquid B formed of 169.3 parts by weight of an isocyanate agent was prepared. Next, a die (master mold and core) capable of forming a cavity having the same shape as a bumper spring 40 as illustrated in FIG. 4 was prepared. Then, the master mold and the core were combined to form the predetermined forming cavity, and then the die formed of the master mold and the core was heated. Subsequently, the liquid A and the liquid B were stirred at 3,000 rpm for 5 seconds (liquid temperature: 40±1° C., NCO index: 1.0), and then the mixture was injected into the die and subjected to primary vulcanization for 10 minutes while the temperature of the die was kept at 70° C. Then, the urethane molded body after the primary vulcanization was demolded from the die, and further subjected to secondary vulcanization (110° C.×16 hours) in an oven. Thus, a urethane bumper spring of interest (height (A): 75 mm, inner diameter (B): 20 mm, outer diameter (C): 57 mm <<see FIG. 4>>) was produced.

Examples 2 to 4 and Comparative Example 1

As shown in Table 1 below, the blending amounts of the respective components and the like were the same as those in Example 1, but the die temperature in the primary vulcanization was changed from that in Example 1. Thus, urethane bumper springs each having a shape as illustrated in FIG. 4 (height (A): 75 mm, inner diameter (B): 20 mm, outer diameter (C): 57 mm <<see FIG. 4>>) was produced.

For the urethane bumper springs of Examples and Comparative Example obtained as described above, various properties were measured and evaluated in accordance with criteria described below. The results of measurement and evaluation are also shown in Table 1 below.

[Density]

From each of a skin layer (within 2 mm from a molded body surface in a thickness direction) and a core portion (portion deeper than the skin layer) in a cross-section of a bumper spring, a sample was cut out, and the density Da (g/cm$^3$) of the skin layer and the density Db (g/cm$^3$) of the core portion were measured using an automatic densimeter DSG-1 manufactured by Toyo Seiki Seisaku-sho, Ltd. to determine Da/Db. The density measurement with the densimeter was performed a total of six times, i.e., at three sites in two samples for each of the skin layer and the core portion, and the average value of the six times of measurement was adopted as a measurement value.

[Foamed Cell Diameter]

Electron micrographs were taken of a skin layer (within 2 mm from a molded body surface in a thickness direction) and a core portion (portion deeper than the skin layer) in a cross-section of a bumper spring, and on the basis of the 10-point average of the diameters (cell diameters) of the (hollow) cells thereof, the foamed cell diameter Ra (μm) of the skin layer and the foamed cell diameter Rb (μm) of the core portion were measured to determine Ra/Rb.

[Durability]

As illustrated in FIG. 4, the bumper spring 40 was fitted onto a servo endurance testing machine including a fitting 43, a piston rod 41, and an abutment portion 42, and was subjected to a repeated (200,000-time) compression test of from 0 N to 7,000 N at a frequency of 2 Hz. The bumper spring 40 has a height (A) of 75 mm, an inner diameter (B) of 20 mm, and an outer diameter (C) of 57 mm. In addition, the piston rod 41 has an outer diameter (D) of 12.5 mm, and the abutment portion 42 has an outer diameter (E) of 50 mm. In addition, the external appearance of the bumper spring was observed at an initial stage and after the 200,000-time compression test, and evaluation was performed by marking a case where a problem such as a crack was found after the compression test with Symbol "x", and marking a case where a problem such as a crack was not found with Symbol "o".

TABLE 1

|  |  | Example | | | | Comparative Example |
|---|---|---|---|---|---|---|
|  |  | 1 | 2 | 3 | 4 | 1 |
|  | Polyol agent | 100 | 100 | 100 | 100 | 100 |
|  | Chain extender | 11.8 | 11.8 | 11.8 | 11.8 | 11.8 |
|  | Catalyst | 1.1 | 1.1 | 1.1 | 1.1 | 1.1 |
|  | Foaming agent | 0.6 | 0.6 | 0.6 | 0.6 | 0.6 |
|  | Isocyanate agent | 169.3 | 169.3 | 169.3 | 169.3 | 169.3 |
|  | NCO index (NCO/OH) | 1.0 | 1.0 | 1.0 | 1.0 | 1.0 |
|  | Die temperature (° C.) | 70 | 90 | 110 | 130 | 50 |
| Density (g/cm$^3$) | Skin layer (Da) | 0.64 | 0.63 | 0.60 | 0.56 | 0.63 |
|  | Core portion (Db) | 0.49 | 0.52 | 0.52 | 0.50 | 0.47 |
|  | Da/Db | 1.32 | 1.22 | 1.16 | 1.13 | 1.34 |

TABLE 1-continued

|  |  | Example | | | | Comparative Example |
|---|---|---|---|---|---|---|
|  |  | 1 | 2 | 3 | 4 | 1 |
| Foamed cell diameter (μm) | Skin layer (Ra) | 83 | 115 | 110 | 114 | 75 |
|  | Core portion (Rb) | 119 | 124 | 139 | 131 | 142 |
|  | Ra/Rb | 0.70 | 0.93 | 0.79 | 0.87 | 0.53 |
| Durability | At 200,000th time | ○ | ○ | ○ | ○ | x |

As apparent from the results of Table 1, in the bumper spring of each of Examples, the problem such as a crack was not found even after the durability test, whereas in the bumper spring of Comparative Example 1, an internal crack occurred after the durability test owing to its excessively large value of Da/Db, and a crack was found in the external appearance.

Although specific embodiments of the present invention have been described in Examples above, Examples are for illustrative purposes only and are not to be construed as limitative. It is intended that various modifications apparent to a person skilled in the art fall within the scope of the present invention.

The urethane bumper spring is suitable as a bumper spring to be mounted onto a piston rod of a shock absorber.

The invention claimed is:

1. A urethane bumper spring having a hollow cylindrical shape produced by mold forming comprising:
   a skin layer as an outer layer; and
   a core portion inside the skin layer,
   wherein the urethane bumper spring is produced from a urethane raw material containing a polyester-based polyol as a polyol component and diphenyl methane diisocyanate as an isocyanate component,
   wherein the skin layer has a density Da and a foamed cell diameter Ra,
   wherein the core portion has a density Db and a foamed cell diameter Rb,
   wherein the densities and foamed cell diameters of the skin layer and the core portion satisfy relationships shown in the following expressions (1) and (2), $$1.0 \leq Da/Db < 1.34 \quad (1)$$

$$0.53 < Ra/Rb \leq 1.0 \quad (2),\text{ and}$$

wherein the urethane bumper spring is configured to be fitted onto a piston rod of a shock absorber of a vehicle so as to elastically restrain an operation stroke of the shock absorber.

2. The urethane bumper spring according to claim 1, wherein the polyester-based polyol is formed of a condensation polymer of ethylene glycol, butanediol, and adipic acid.

3. The urethane bumper spring according to claim 1, wherein the density Da of the skin layer falls within a range of from 0.4 g/cm³ to 0.7 g/cm³.

4. The urethane bumper spring according to claim 1, wherein the density Db of the core portion falls within a range of from 0.4 g/cm³ to 0.7 g/cm³.

5. The urethane bumper spring according to claim 1, wherein the foamed cell diameter Ra of the skin layer falls within a range of from 25 μm to 400 μm.

6. The urethane bumper spring according to claim 1, wherein the foamed cell diameter Rb of the core portion falls within a range of from 25 μm to 400 μm.

7. The urethane bumper spring according to claim 1, wherein the polyester-based polyol has a number-average molecular weight (Mn) of from 500 to 4,000.

8. The urethane bumper spring according to claim 1, wherein the polyester-based polyol has a number-average molecular weight (Mn) of from 1,000 to 3,000.

9. The urethane bumper spring according to claim 1, wherein the urethane bumper spring is produced from a urethane raw material having an NCO index of from 0.9 to 1.3.

10. A method of producing the urethane bumper spring of claim 1, the method comprising:
    injecting the urethane raw material containing the polyester-based polyol as the polyol component and diphenylmethane diisocyanate as the isocyanate component into a cavity of a forming mold, followed by heating at 70° C. or more, to thereby subject the urethane raw material to primary vulcanization in the forming mold;
    removing a urethane molded body after the primary vulcanization from the forming mold; and
    heating the urethane molded body after removing the urethane molded body to subject the urethane molded body to secondary vulcanization.

11. The method of producing the urethane bumper spring according to claim 10, wherein the forming mold to be used comprises a forming mold formed of a master mold and a core.

12. The method of producing the urethane bumper spring according to claim 10, wherein the heating in the primary vulcanization is performed at a temperature of from 70° C. to 130° C.

13. The method of producing the urethane bumper spring according to claim 10, wherein the heating in the primary vulcanization is performed for from 2 minutes to 60 minutes.

14. The method of producing the urethane bumper spring according to claim 10, wherein the injecting the urethane raw material into the cavity of the forming mold is performed after preparation of a prepolymer in advance in accordance with a prepolymer method.

15. The method of producing the urethane bumper spring according to claim 10, wherein the injecting the urethane raw material into the cavity of the forming mold is performed in such a manner that the polyol component and the isocyanate component are mixed in the cavity of the forming mold in accordance with a one-shot method.

16. The method of producing the urethane bumper spring according to claim 10, wherein the urethane bumper spring is produced from a urethane raw material having an NCO index of from 0.9 to 1.3.

17. The method of producing the urethane bumper spring according to claim 10, wherein the heating in the secondary vulcanization is performed at a temperature of from 100° C. to 150° C. for from 3 hours to 20 hours.

18. The method of producing the urethane bumper spring according to claim 10, wherein a liquid temperature of the urethane raw material injected into the cavity of the forming mold is at from 39 to 41° C.

* * * * *